(12) United States Patent
Ichioka et al.

(10) Patent No.: US 7,102,810 B1
(45) Date of Patent: Sep. 5, 2006

(54) METHOD FOR EXTRA-HIGH SPEED TRANSFORMATION OF TIME SIGNAL INTO TWO-DIMENSIONAL SPACE SIGNAL

(75) Inventors: Yoshiki Ichioka, Hyogo (JP); Tsuyoshi Konishi, Osaka (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/937,522

(22) PCT Filed: Mar. 24, 2000

(86) PCT No.: PCT/JP00/01816

§ 371 (c)(1),
(2), (4) Date: Feb. 1, 2002

(87) PCT Pub. No.: WO00/58784

PCT Pub. Date: Oct. 5, 2000

(30) Foreign Application Priority Data

Mar. 26, 1999 (JP) .................................. 11-083905

(51) Int. Cl.
*G02F 1/37* (2006.01)
*G02F 1/35* (2006.01)

(52) U.S. Cl. ........................................ 359/328; 359/326
(58) Field of Classification Search ......... 359/326–332
See application file for complete search history.

(56) References Cited

U.S. PATENT DOCUMENTS 5,353,149 A * 10/1994 Urakami et al. ............. 359/326
5,528,389 A   6/1996 Nuss ............................ 359/4

FOREIGN PATENT DOCUMENTS

| JP | 5-72047 | 3/1993 |
|---|---|---|
| JP | 5-100256 | 4/1993 |
| JP | 11-46304 | 2/1999 |

OTHER PUBLICATIONS

J. Opt. Soc. Am.A, vol. 14, No. 5 (May 1997), P.C.Sun, Y.T. Mazurenko, Y. Fainman, "Femtosecond pulse imaging: ultrafast optical oscilloscope", pp. 1159-1170.
Proceeding of SPIE, vol. 3137 (Jul. 1997), Phtorefractive Fiber and Crystal Devices: Materials, Optical Properties, and Applications, Yoshiki Ichioka, Tsuyoshi Konishi, "Temporal-spatial optical information processing", pp. 222-227.

(Continued)

*Primary Examiner*—John D. Lee
(74) *Attorney, Agent, or Firm*—Wenderoth, Lind & Ponack, L.L.P.

(57) ABSTRACT

A signal light pulse to be converted into a two-dimensional space signal and a reference ultra-short light pulse are directed to a dispersion device, a second-harmonic is generated by introducing a one-dimensional frequency light distribution obtained by a one-dimensional Fourier transform lens, the second-harmonic is then subjected to time-to-space conversion through a one-dimensional Fourier transform lens so as to obtain a light wave distribution, and the light wave distribution is then subjected to filtering by a time-frequency filter provided on a filter plane of a one-dimensional space frequency filtering optical system and is further converted into a two-dimensional space signal corresponding to a time-frequency expanded two-dimensional light distribution which represents a relation between time and frequency of the signal pulse light. Thereby, there is provided a specific technique of realizing ultra-fast conversion of signal form from time signal into two-dimensional space signal without any active-scan and also displaying the two-dimensional signal in a visible region with a temporally steady state.

7 Claims, 1 Drawing Sheet

OTHER PUBLICATIONS

Extended Abstracts, No. 3 (Mar. 1998), 45th Meeting of Ouyou Butsuri Gakkai Kankei Rengou, T. Konishi, Y. Oka, Y. Ichioka, "Jikuu kan Hikari Jouhou Shori: II-1 Jigen Jikan Shingou—2 Jigen Kuukan Shingou Henkan", p. 993, 3Op-C-1.

Extended Abstracts, No. 3, 46th Meeting of Ouyou Butsuri Gakkai Kankei Rengou, (Mar. 1999), T. Konishi, Y. Oka, Y. Ichioka, "Jikuu kan Hikari Jouhou Shori: VI-SHG Kesshou wo mochiita 1 Jigen Jikan Shingou—2 Jigen Kuukan Shingou Henkan", p. 1073, 3Op-V-1.

Opt.Lett., vol. 19, No. 9, (May 1, 1994, Martin C. Nuss, Melissa Li, T.H. Chiu, "Time-to-space mapping of femtosecond pulses", pp. 664-666.

* cited by examiner

METHOD FOR EXTRA-HIGH SPEED TRANSFORMATION OF TIME SIGNAL INTO TWO-DIMENSIONAL SPACE SIGNAL

TECHNICAL FIELD

The present invention relates to a method for ultra-fast conversion of two-dimensional information encoded to an ultra-short light pulse signal into a two-dimensional space signal.

BACKGROUND ART

In optical communication, transmission capacity has been increased by using methods such as time multiplexing or wavelength multiplexing for realization of real-time transmission of multi-media information (particularly, image information). The signal form used for the real-time transmission is basically a time signal. Because of the transmission capacity increase, it is necessary to perform conversion (encoding) of information to be transmitted into time signals and expansion (decoding) of the information converted into the time signals at a ultra-high speed. For this reason, there has been proposed a "space-to-time-to-space signal processing method" which realizes ultra-fast conversion of signal form between time signal and two or more dimensional space signal such as image information. However, this space-to-time-to-space signal processing method has a problem that must be solved in time-to-two-dimensional space signal conversion technology.

Various methods have been proposed as the method for realizing ultra-fast conversion of signal form between time signal and space signal. However, although the conventional methods are capable of carrying out ultra-fast conversion into one-dimensional space signal, some of them basically need to perform active scanning for conversion into two or more dimensional space signal and thus have a limitation in transformation speed. On the other hand, there are some methods that do not need to perform active scanning, but space signal converted by such methods cannot be observed with any ultra-fast light-receiving device available today.

SUMMARY OF THE INVENTION

Accordingly, an object of the present invention is to provide a method for ultra-fast conversion of time signal into two-dimensional space signal which is capable of realizing ultra-fast conversion of signal form from time signal to two-dimensional space signal without performing active-scan and also is capable of displaying the two-dimensional space signal in a visible region with a temporally steady state.

To attain the above-described object, firstly, the present invention provides a method for ultra-fast conversion of time signal into two-dimensional space signal, wherein a signal light pulse and a reference ultra-short light pulse having an appropriate width in space are introduced into a nonlinear crystal through a dispersion device and a one-dimensional Fourier transformation optical system. A second-harmonic which is generated by satisfying phase matching condition in the nonlinear crystal in subjected to time-to-space conversion through an inverse one-dimensional Fourier transformation optical system so as to be converted into a one-dimensional space distribution, the time-to-space converted one-dimensional space distribution is subjected to filtering with a time-frequency filter provided on a filter plane of a one-dimensional space frequency filtering optical system, and a time-frequency expanded two-dimensional light distribution representing a relation between time and frequency of the signal pulse light is regarded as a two dimensional space signal.

Secondly, the present invention provides a method for ultra-fast conversion of time signal into two-dimensional space signal, wherein a signal light pulse and a reference ultra-short light pulse having an appropriate width in space are introduced into a dispersion device at angles symmetric with respect to the optical axis. Light waves from the signal light pulse and the reference ultra-short light pulse which are a dispersed due to a time difference generated by a difference of incident positions on the dispersion device are passed through a one-dimensional Fourier transformation optical system so as to be converted into one-dimensional frequency light distributions having different incident angles depending on the incident positions on the dispersion device. The one-dimensional frequency light distributions is introduced into a nonlinear optical crystal, a second-harmonic which is generated by satisfying phase matching condition determined depending on an angle formed by the incident one-dimensional frequency light distributions is subjected to time-to-space conversion through an inverse one-dimensional Fourier transformation optical system so as to be converted to an one-dimensional space distribution, the time-to-space converted one-dimensional space distribution is converted into a one-dimensional space frequency distribution by a one-dimensional Fourier transformation optical system, and the one-dimensional space frequency distribution is subjected to filtering by a time-space filter. The light wave thus obtained is subjected to time-frequency expansion through an inverse one-dimensional Fourier transform optical system so as to obtain an intensity distribution of a two-dimensional light distribution, and the time-frequency expanded two-dimensional light distribution representing a relation between time and frequency of the signal pulse light is regarded as a two dimensional space signal.

Thirdly, the present invention provides the above-described methods for ultra-fast conversion of time signal into two-dimensional space signal, wherein space frequency filtering is employed as the time-frequency filter, and fourthly, the present invention provides either of the above-described methods for ultra-fast conversion of time signal into two-dimensional space signal, wherein the time-frequency filter has a different transmissivity distribution and a vertical cut out position of a space frequency component of a light wave outputted from the one-dimensional Fourier Transform light system is arbitrarily selected.

Figure 1:
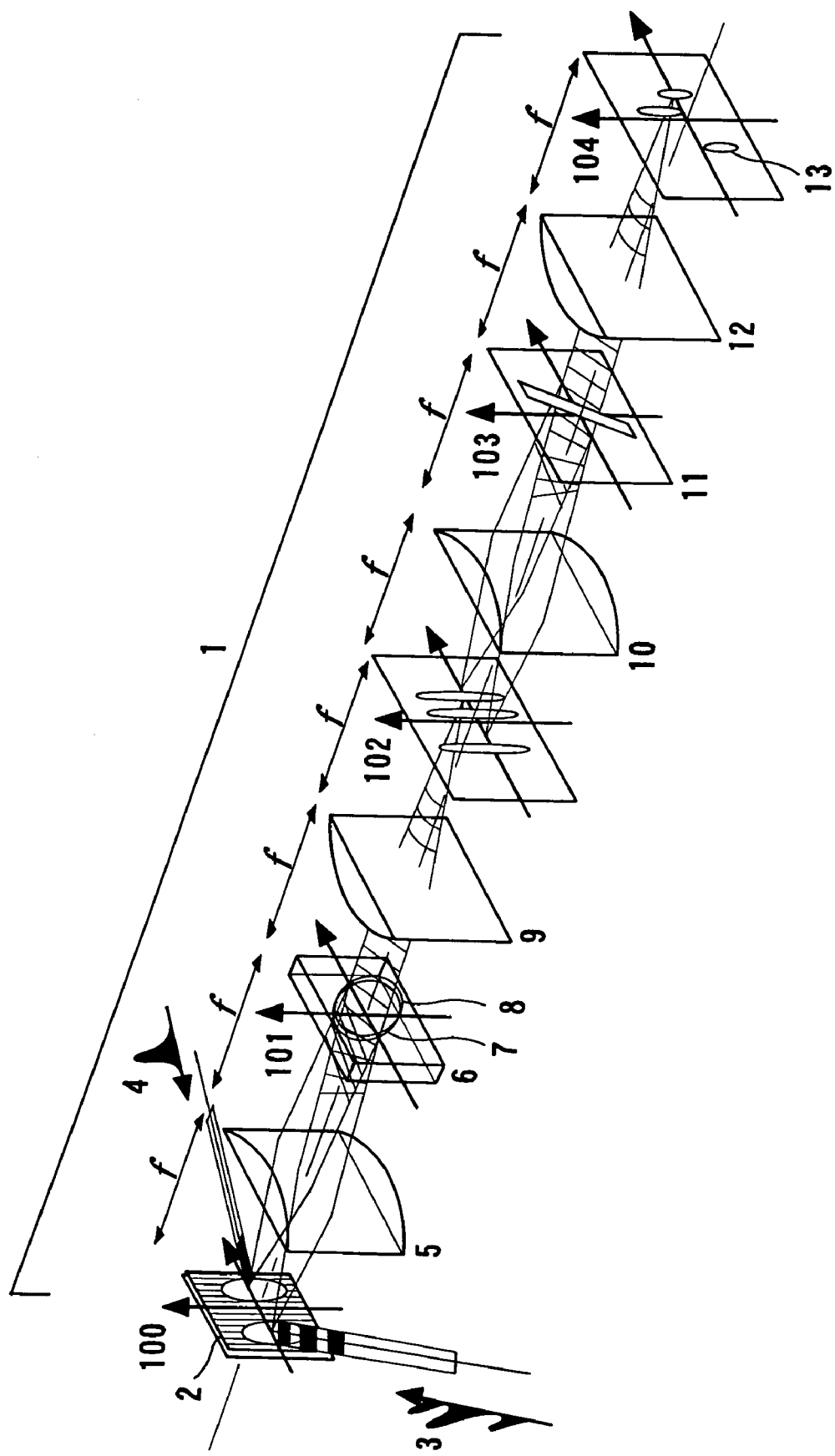
FIG. 1 is a diagram showing an example of the structure of time-to-two-dimensional space signal conversion optical system to be used in the method for ultra-fast conversion of time signal into two-dimensional space signal according to the present invention.

Reference numerals designate the followings.

1: time-to-two-dimensional space signal conversion optical system
2: diffraction grating
3: signal light
4: reference light
5: cylindrical lens
6: nonlinear crystal
7: one-dimensional frequency distribution of signal light
8: one-dimensional frequency distribution of reference light
9: cylindrical lens 10: cylindrical lens
11: time-frequency filter
12: cylindrical lens
13: two-dimensional space distribution
100: incident plane
101: nonlinear crystal plane
102: time-to-space conversion plane
103: time-frequency filter plane
104: output plane

BEST MODE FOR CARRYING OUT THE INVENTION

The present invention has the forgoing features, and the embodiment thereof will be described hereinafter.

FIG. 1 shows an example of the structure of the time-to-two-dimensional space signal conversion optical system for performing the method of ultra-fast conversion from time signal to two-dimensional space signal according to the present invention. This time-to-two-dimensional space signal conversion optical system 1 is capable of converting a signal light pulse being a time signal, which is ultra-short pulse laser light in this example, into a two-dimensional space signal corresponding to time and frequency by using a dispersion device such as a diffraction grating, a one-dimensional Fourier transformation lens, a one-dimensional inverse-Fourier transformation lens, a nonlinear crystal for generation of a second-harmonic, a one-dimensional space frequency filtering system, and time-frequency filter. That is, as shown in PLO1, signal lights (3) and (4) are introduced into a diffraction grating (2), which is a dispersion device, at angles symmetric with respect to the optical axis, and thereby light waves are deflected in a direction based on the diffraction formula. Because each of the signal light and the reference light has a certain width in its incident beam, a time difference occurs depending on their incident positions onto the diffraction grating. Then, the light waves are subjected to Fourier transform with respect to horizontal components by a one-dimensional Fourier transform optical system composed of a cylindrical lens (5), and thereby spectrum distributions of the signal light and the reference light are obtained on a nonlinear crystal plane (101) as space distributions. Because the propagation direction (wave vector) of the lightwave differs depending on a difference of the incident position onto the diffraction grating, the wavefront of the light wave rotates with time in the nonlinear crystal plane 101.

When the light waves of the signal light and the reference light are introduced into the nonlinear crystal, there in emitted a second-harmonic whose wave vector is a sum of two wave vectors by phase matching due to nonlinear effect. Although the wave vectors of the light waves of the signal light and the reference light rotate with time, the second-harmonic continues to be emitted in a steady state on time basis because change rates of the rotation with time are equal. Therefore, the wave vector of the second-harmonic depends on only initial wave vectors of the wave vectors of the two light waves, so that it depends on a relative time between the signal light and the reference light. Further, within the nonlinear crystal, the light wave of the signal light is scanned by the light wave of the reference light and thus the space distribution of the second harmonic becomes equal to the spectrum distribution 7 of the signal light.

The second-harmonic thus obtained is image-formed on a time-frequency filter plane (103) by an image-formation optical system comprised of cylindrical lenses (9)(10). As a time-frequency filter (11), a filter designed such that the frequency of frequency component to be cut out is increased in order in a vertical direction is used. By changing transmissivity distribution of the time-frequency filter, it is possible to set up which frequency component can be cut out to which position in the vertical direction.

The second-harmonic filtered by the time-frequency filter has a wave vector corresponding to time in a horizontal direction and a distribution corresponding to frequency in a vertical direction. This second-harmonic is subjected to Fourier transformation about its horizontal direction component by a one-dimensional inverse Fourier transformation optical system comprised of a cylindrical lens (12). As a result, there is obtained, on an output plane (104), a two-dimensional space distribution (13) of the light wave-having a time distribution in the horizontal axis direction and a spectrum distribution in the vertical direction. Consequently, it is possible to convert the time signal contained in the ultra-short light pulse into the two-dimensional space distribution of time and frequency.

Of course, the present invention is not restricted to the above-described example and may be changed or modified in various ways. For example, although the diffraction grating is employed as the dispersion device in the above-described example, another dispersion device may be used. Further, although the cylindrical lenses are employed as the Fourier transformation optical system and the inverse-Fourier transformation optical system in the above-described example, another optical device may be used. Furthermore, although the transmission type filter is used as the time-frequency filter in the above-described example, a phase type filter may also be used.

INDUSTRIAL APPLICABILITY

As described above, according to the method for ultra-fast conversion of time signal into two-dimensional space signal of the present invention, it is possible to convert the time signal into its corresponding two-dimensional space signal at an ultra-high speed without performing active-scan unlike the conventional method, and also display the converted signal directly with a visible light when an infrared ray falling in a wavelength region used in optical transmission is employed.

The invention claimed is:

1. A method for ultra-fast conversion of time signal into two-dimensional space signal, the method comprising:
   introducing a signal light pulse and a reference ultra-short light pulse having an appropriate width in space into a nonlinear crystal through a dispersion device and a one-dimensional Fourier transformation optical system;
   subjecting a second-harmonic, which is generated by satisfying a phase matching condition in the nonlinear crystal, to time-to-space conversion through an inverse one-dimensional Fourier transformation optical system so as to be converted into a one-dimensional space distribution; and
   subjecting the time-to-space converted one-dimensional space distribution to filtering with a time-frequency filter provided on a filter plane of a one-dimensional space frequency filtering optical system,
   wherein a time-frequency expanded two-dimensional light distribution representing a relation between time and frequency of the signal light pulse is regarded as a two-dimensional space signal.

2. A method for ultra-fast conversion of time signal into two-dimensional space signal, the method comprising:

introducing a signal light pulse and a reference ultra-short light pulse having an appropriate width in space into a dispersion device at angles symmetric with respect to an optical axis;

passing light waves from the signal light pulse and the reference ultra-short light pulse, which are dispersed due to a time difference generated by a difference of incident positions on the dispersion device, through a one-dimensional Fourier transformation optical system so as to be converted into one-dimensional frequency light distributions having different incident angles depending on the incident positions on the dispersion device;

introducing the one-dimensional frequency light distributions into a nonlinear optical crystal;

subjecting a second-harmonic, which is generated by satisfying a phase matching condition determined depending on an angle formed by the incident one dimensional frequency light distributions, to time-to-space conversion through an inverse one-dimensional Fourier transformation optical system so as to be converted to a one-dimensional space distribution;

converting the time-to-space converted one-dimensional space distribution into a one-dimensional space frequency distribution by a one-dimensional Fourier transformation optical system;

subjecting the one-dimensional space frequency distribution to filtering by a time-frequency filter; and subjecting the light wave thus obtained to time-frequency expansion through an inverse one-dimensional Fourier transform optical system so as to obtain an intensity distribution of a two-dimensional light distribution, wherein the time-frequency expanded two-dimensional light distribution representing a relation between time and frequency of the signal light pulse is regarded as a two-dimensional space signal.

3. The method for ultra-fast conversion of time signal into two-dimensional space signal according to claim 1, wherein a space frequency filter is employed as the time-frequency filter.

4. The method for ultra-fast conversion of time signal into two-dimensional space signal according to claim 1, wherein the time-frequency filter has a different transmissivity distribution and a vertical cut out position of a space frequency component of a light wave outputted from the one-dimensional Fourier Transform light system is arbitrarily selected.

5. The method for ultra-fast conversion of time signal into two-dimensional space signal according to claim 2, wherein a space frequency filter is employed as the time-frequency filter.

6. The method for ultra-fast conversion of time signal into two-dimensional space signal according to claim 2, wherein the time-frequency filter has a different transmissivity distribution and a vertical cut out position of a space frequency component of a light wave outputted from the one-dimensional Fourier Transform light system is arbitrarily selected.

7. The method for ultra-fast conversion of time signal into two-dimensional space signal according to claim 3, wherein the time-frequency filter has a different transmissivity distribution and a vertical cut out position of a space frequency component of a light wave outputted from the one-dimensional Fourier Transform light system is arbitrarily selected.

* * * * *